US 6,687,598 B2

United States Patent
Oota et al.

(10) Patent No.: US 6,687,598 B2
(45) Date of Patent: Feb. 3, 2004

(54) METHOD AND SYSTEM FOR CONTROLLING AN ENGINE WITH ENHANCED TORQUE CONTROL

(75) Inventors: Kenji Oota, Kanagawa (JP); Hiroshi Iwano, Kanagawa (JP); Hiroyuki Itoyama, Yokohama (JP); Takeshi Ishino, Chiba (JP); Kensuke Osamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 131 days.

(21) Appl. No.: 10/107,490

(22) Filed: Mar. 28, 2002

(65) Prior Publication Data

US 2002/0143459 A1 Oct. 3, 2002

(30) Foreign Application Priority Data

Mar. 30, 2001 (JP) .................................. 2001-101696
Nov. 28, 2001 (JP) .................................. 2001-362935

(51) Int. Cl.$^7$ ........................ F02D 33/02; F02D 35/00; F02D 41/14; F02D 41/26; F02M 25/07
(52) U.S. Cl. .................. 701/104; 701/108; 123/568.21; 123/492
(58) Field of Search ............................ 123/399, 672, 123/679, 689, 299, 300, 304, 305, 478, 480, 486, 492, 493, 350, 694, 192.1; 701/101, 102, 103, 104, 105, 108, 109, 115; 60/274, 276, 285, 286, 295, 297, 301, 602, 605.2; 73/116, 117.3, 118.1, 118.2; 700/44

(56) References Cited

U.S. PATENT DOCUMENTS

| | | | |
|---|---|---|---|
| 4,545,009 A | * | 10/1985 | Muraki et al. ............. 700/44 |
| 4,676,213 A | * | 6/1987 | Itsuji et al. ................ 123/694 |
| 5,343,701 A | * | 9/1994 | Douta et al. ............... 60/276 |
| 5,415,139 A | * | 5/1995 | Aoto et al. ................ 123/192.1 |
| 5,437,153 A |  | 8/1995 | Takeshima et al. |
| 5,473,888 A | * | 12/1995 | Douta et al. .............. 60/276 |
| 5,622,053 A | * | 4/1997 | Freen ........................ 123/299 |
| 5,727,528 A | * | 3/1998 | Hori et al. ................ 123/486 |
| 5,894,725 A |  | 4/1999 | Cullen et al. |
| 5,921,223 A | * | 7/1999 | Fukuma .................. 123/568.21 |
| 6,244,047 B1 |  | 6/2001 | Brehob et al. |
| 6,289,672 B1 |  | 9/2001 | Katoh et al. |
| 6,412,469 B1 | * | 7/2002 | Itoyama et al. .......... 701/104 |
| 2002/0100454 A1 | * | 8/2002 | Itoyama et al. .......... 123/350 |
| 2002/0124832 A1 | * | 9/2002 | Oota et al. ................ 701/103 |

FOREIGN PATENT DOCUMENTS

| | | | |
|---|---|---|---|
| JP | 408326595 A | * | 12/1996 |
| JP | 4083338318 A | * | 12/1996 |
| JP | 409014016 A | * | 1/1997 |
| JP | 11-294145 | | 10/1999 |

* cited by examiner

Primary Examiner—Willis R. Wolfe
(74) Attorney, Agent, or Firm—Foley & Lardner

(57) ABSTRACT

A method for controlling an engine comprises establishing a torque correction coefficient (KA) to compensate for reducing effect of available engine torque in operating range of different excess air ratios (λ) that are lower than a predetermined value (unity=1). An initial base desired in-cylinder air mass (tQacb) is determined based on a requested engine torque (tTe). A desired excess air ratio (tλ) is determined. The initial base desired in-cylinder air mass (tQacb) is adjusted with at least the desired excess air ratio (tλ) and the correction coefficient (KA) to generate a desired in-cylinder air mass (tQac). A desired injected fuel mass (tQf) is controlled based on the desired in-cylinder air mass (tQac) to deliver the requested engine torque (tTe) with the desired excess air ratio (tλ) held accomplished.

18 Claims, 18 Drawing Sheets

FIG.22

```
ENTER (260)
  ↓
INPUT Qacn AND Kkin  (262)
  ↓
COMPUTE ACTUAL IN-CYLINDER
AIR MASS rQac
rQac=Qacn×Kkin+Qac(n-1)×(1-Kkin)  (264)
  ↓
RETURN
```

FIG.23

```
ENTER (270)
  ↓
INPUT rQac, tEGR AND Kkin  (272)
  ↓
COMPUTE IN-COLLECTOR
EGR MASS Qec0
Qec0=Qacn×tEGR  (274)
  ↓
COMPUTE ACTUAL IN-CYLINDER
EGR MASS rQec
rQec=Qec0×Kkin×KE#+Qec0(n-1)×(1-Kkin×KE#)  (276)
  ↓
RETURN
```

METHOD AND SYSTEM FOR CONTROLLING AN ENGINE WITH ENHANCED TORQUE CONTROL

BACKGROUND OF THE INVENTION

1. Field of the Invention

The present invention relates to a method and system for controlling an engine.

2. Description of the Background Art

Modern automotive engines have a controller and a combustion chamber. The controller causes the combustion chamber to operate alternately on a lean air/fuel mixture (oxygen excess) and a rich air/fuel mixture (oxygen deficiency). The exhaust gases resulting from combustion are supplied to a catalytic converter, which is provided, inter alia, for reducing the nitrogen oxides.

Internal combustion engines of this kind are disclosed in U.S. Pat. No. 5,437,153 issued Aug. 1, 1995 to Takeshima et al., and U.S. Pat. No. 6,289,672 B1 issued Sep. 18, 2001 to Katoh et al.

Researches have used various names to refer to a catalytic converter of the above-mentioned kind. For example, Takeshima et al. called it "a NOx absorbent or trap." Katoh et al. called it "a NOx occluding and reducing catalyst." In the following description, the term "a NOx trap" is herein used to mean a catalytic converter of the above kind.

A NOx trap utilizes alkali metal or alkaline earth metal in combination with platinum in order to store or occlude the nitrogen oxides when there is oxygen excess. When there is oxygen deficiency, the NOx trap releases the trapped nitrogen oxides. Under this operating condition called "purge mode", the oxygen is withdrawn from the absorbed nitrogen oxides, and the hydrocarbons (HC) and the carbon monoxides (CO) generated by the combustion are all oxidized with this oxygen.

The NOx trap can, however, only absorbs a limited mass of nitrogen oxides. As a result, the NOx trap must be purged after a certain loading time in which it traps the nitrogen oxides. During the purging or "NOx purge cycle," the NOx trap releases the nitrogen oxides so that it can be charged anew. If the NOx trap is purged too late, it is "filled" and can no longer absorb the nitrogen oxides, allowing them to escape into the environment. If the NOx trap is purged too long, it is "empty" and can no longer supply nitrogen oxides as a source of oxygen for oxidizing the hydrocarbons and carbon monoxides, allowing them to escape into the environment.

The charging and purging of the NOx trap must therefore be controlled. This is achieved by means of the oxygen inflow. During oxygen excess, the catalytic converter is charged with nitrogen oxides. During oxygen deficiency, the NOx trap is purged and releases nitrogen oxides. In the above-mentioned Takeshima et al., the controller changes over from the oxygen excess to the oxygen deficiency when estimate, in mass or amount, of the absorbed nitrogen oxides exceeds a threshold.

In Takeshima et al., the controller causes an increase in fuel injection time to make air/fuel mixture in the combustion chamber rich when the oxygen deficiency is requested. Takeshima et al. also discloses application to Diesel engine wherein the controller causes an injector to feed reducing agent, such as, gasoline, into the exhaust pipe before the catalytic converter when the oxygen deficiency is requested.

In the above-mentioned Katoh et al., the controller causes a secondary fuel injection in the expansion or exhaust stroke to provide the oxygen deficiency when the engine operates on varying of air/fuel ratios falling in a region of moderate lean air/fuel mixtures with air/fuel ratios less than 20.

JP-A 11-294145 discloses an internal combustion engine equipped with an injector for feeding reducing agent into the exhaust pipe and an exhaust throttle upstream of the injector for restricting flow of exhaust gas to minimize consumption of reducing agent. In JP-A 11-294145, a controller, in response to request for the oxygen deficiency, causes restriction of exhaust gas flow as well as injection of reducing agent into the exhaust pipe for a catalyst to release nitrogen oxides. To suppress a drop in available engine torque due to pumping loss caused by the restriction of exhaust gases, the controller causes an alteration of at least one engine operating parameter to increase engine torque.

In the prior art, the secondary injection is carried out in response to the oxygen deficiency request. Utilizing the secondary injection causes an increase in fuel consumption. Besides, the fuel used for the secondary injection does not contribute to combustion, resulting in waste of energy. In the above-mentioned JP-A 11-294145, in order to compensate for reducing effect of available engine torque due to pumping loss caused by restriction of exhaust gas flow, the controller causes an increase in fuel to be combusted. The amount of such increase in fuel is so determined as to compensate for the reduction in available engine torque only without any concern on possible alteration in composition of exhaust gases resulting from the combustion of increased fuel with the decreased excess air ratio ($\lambda$). Although this control strategy has utilized alteration of engine operating parameter to compensate for the reducing effect of available engine torque, the prior art fails to teach the enhanced torque control of the present invention.

In the prior art, the air/fuel mixture is altered in response to oxygen deficiency request. In the before-mentioned Takeshima et al., engine operation on rich air/fuel mixture is accomplished in response to the oxygen deficiency request. Under this operating condition, the excess air ratio is or less than unity ($\lambda=1$ or $\lambda<1$). This control strategy fails to account for alteration of available engine torque due to such change in air/fuel mixture. Apparently, such alternation of available engine torque is regarded as a problem in the before-mentioned Katoh et al. To solve this problem, Katoh et al. teach changing over from the oxygen excess to the oxygen deficiency when the alternation of available engine torque is not noticeable to the operator. Accordingly, the prior art has not yet to teach the enhanced torque control of the present invention.

There is, therefore, a need to develop a control strategy for controlling an engine utilizing enhanced engine torque control operation.

SUMMARY OF THE INVENTION

It is an object of the present invention to provide a method and system for controlling an engine through enhanced management of various control parameters.

In carrying out the above object and other objects and features of the present invention, there is provided a method for controlling an engine. The method comprises establishing a correction coefficient to compensate for reducing effect of available engine torque in operating range of different excess air ratios that are lower than a predetermined value. The method also comprises determining an initial base desired in-cylinder air mass based on a requested engine torque, and determining a desired excess air ratio. The initial base desired in-cylinder air mass is adjusted with at least the desired excess air ratio and the torque correction coefficient to generate a desired in-cylinder air mass. The method also comprises determining a desired injected fuel mass based on the desired in-cylinder air mass for fuel injection to deliver the requested engine torque with the desired excess air ratio held accomplished.

A system is also provided for carrying out the method.

BRIEF DESCRIPTION OF THE DRAWINGS

Further objects and advantages of the invention will be apparent from reading of the following description in conjunction with the accompanying drawings.

FIG. 22 is a simplified flowchart of an actual in-cylinder air mass (rQac) computation routine.

FIG. 23 is a simplified flowchart of an actual in-cylinder EGR mass (rQec) computation routine.

DETAILED DESCRIPTION OF THE INVENTION

Figure 1:
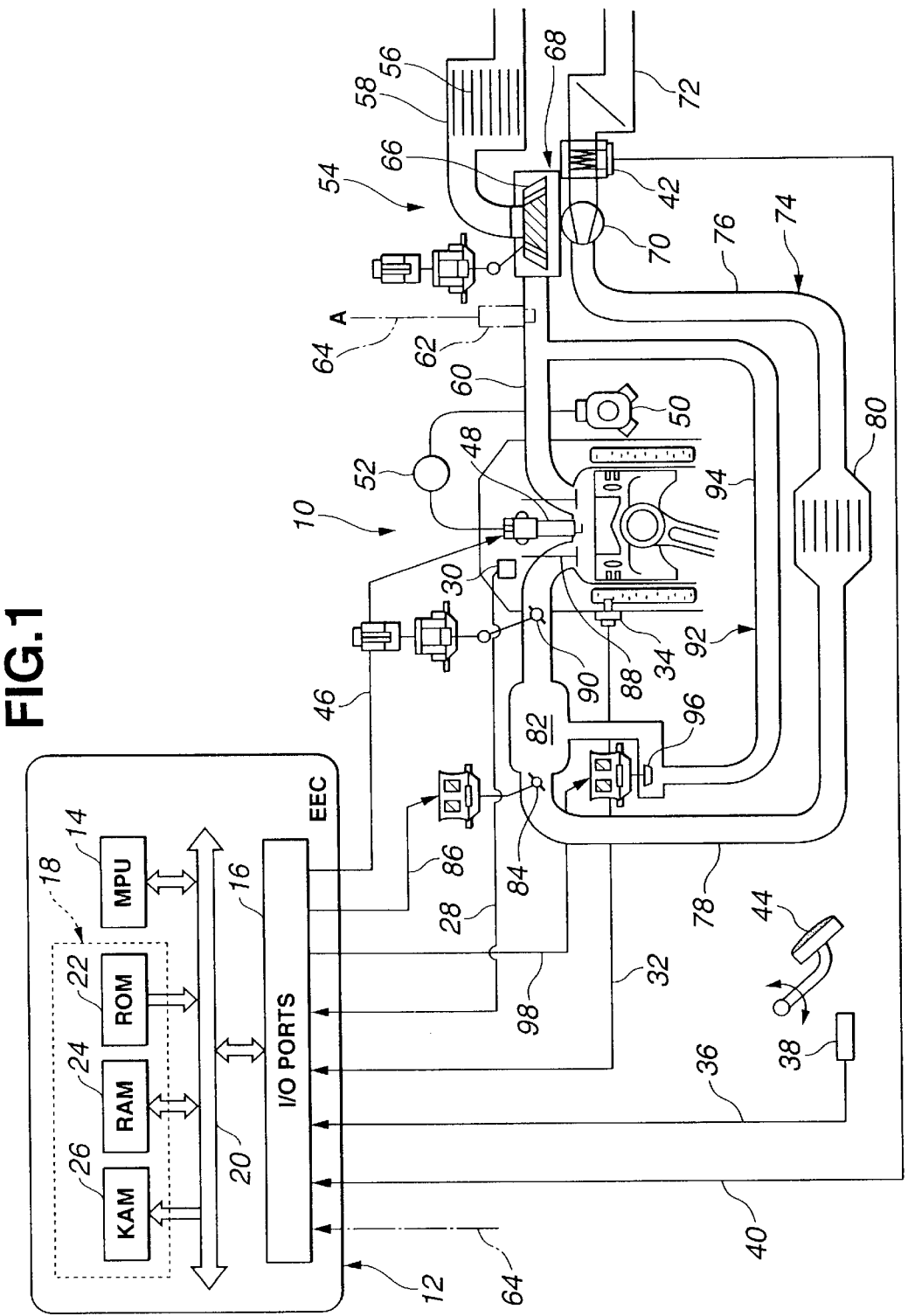
FIG. 1 is a schematic block diagram of an internal combustion engine and an electronic engine controller in accordance with one embodiment of the present invention.

Referring now to the accompanying drawings, and initially to FIG. 1, a schematic block diagram of an internal combustion engine and an electronic engine controller in accordance with one embodiment of the present invention is illustrated. The internal combustion engine 10 includes a plurality of combustion chambers, or cylinders, one of which is shown in FIG. 1. The electronic engine controller (EEC) 12 controls the engine 10.

The EEC 12 is preferably a microcomputer-based controller. Controller 12 includes a microprocessor (MPU) 14 in communication with input and output (I/O) ports 16, and computer readable storage media 18 via a data control bus 20. Computer readable storage media 18 may include various types of volatile and nonvolatile memory such as read only memory (ROM) 22, random access memory (RAM) 24 and keep-alive memory (KAM) 26. These "functional" descriptions of the various types of volatile and nonvolatile storage may be implemented by any number of known physical devices including but not limited to EPROMs, EEPROMs, PROMs, flash memory, and the like. Computer readable storage media 18 include stored data representing instructions executable by microprocessor 14 to implement the method for controlling engine according to the present invention.

The EEC 12 receives a plurality of signals from the engine 10 via I/O ports 16. These signals include, but are not limited to, a cylinder identification (CID) signal 28 from a cylinder identification (CID) sensor 30, an engine coolant temperature (ECT) signal 32 from an engine coolant temperature (ECT) sensor 34, an accelerator pedal position (APP) signal 36 from an accelerator pedal position (APP) sensor 38, and an airflow signal 40 from an airflow sensor 42. APP sensor 38 provides APP signal 36, which is an indication of the position of an accelerator pedal 44 manipulated by the driver. The driver manipulates accelerator pedal 44 to control the output of a powertrain, not shown, including engine 10.

Controller 12 processes these signals received from engine 10 and generates a fuel injector signal transmitted on signal line 46 to fuel injector 48 to control the amount of fuel delivered by the fuel injector 48. A pump 50 sends fuel from a fuel tank, not shown, through a common rail 52 to a set of fuel injectors 48. Fuel injectors 48 are positioned to inject fuel into their associated combustion chambers in amounts as determined by controller 12. The fuel tank contains liquid fuel, such as gasoline, methanol or a combination of fuel types.

An exhaust system 54 transports exhaust gas produced from combustion of an air/fuel mixture in the combustion chambers to a NOx trap 56 composed of material of the type previously described. NOx trap 56 is contained in a housing 58. Exhaust system 54 includes an exhaust manifold 60. An exhaust gas oxygen sensor (EGO) sensor 62 may be provided, which detects or measures the oxygen content of the exhaust gas produced by combustion within the combustion chambers, and transmits an oxygen signal 64 to controller 12. In the engine illustrated in FIG. 1, a turbine 66 of a supercharger 68 is disposed in exhaust system 54 downstream of exhaust manifold 60 and upstream of NOx trap 56.

Supercharger 68 includes a compressor 70 downstream of airflow sensor 42, which is disposed downstream of an air cleaner 72 of an intake system 74. Intake system 74 includes an intake pipe 76 and an intake manifold 78. An intercooler 80 is disposed downstream of compressor 80 to send conditioned intake air to intake manifold 78. Intake manifold 78 includes a collector 82. A throttle valve of the electromagnetically controlled type 84 is disposed upstream of collector 82. Throttle 84 opens in response to a throttle command signal 86. Intake valve 88 operates to open and close its associated intake port to control entry of air into combustion chamber. Intake valve 88 in combination with a swirl control valve (SCV) 90 allows for two-stage manifold operation including a swirl generation operation.

An exhaust gas recirculation (EGR) system 92 transports a portion of exhaust gas from exhaust manifold 60 to collector 82 of intake manifold 78. EGR system 92 includes a passage 94 having one end connected to exhaust manifold 60 and opposite end connected to collector 82. An EGR control valve 96 receives an EGR command signal 98 to control flow of exhaust gas through passage 94.

Figure 2:
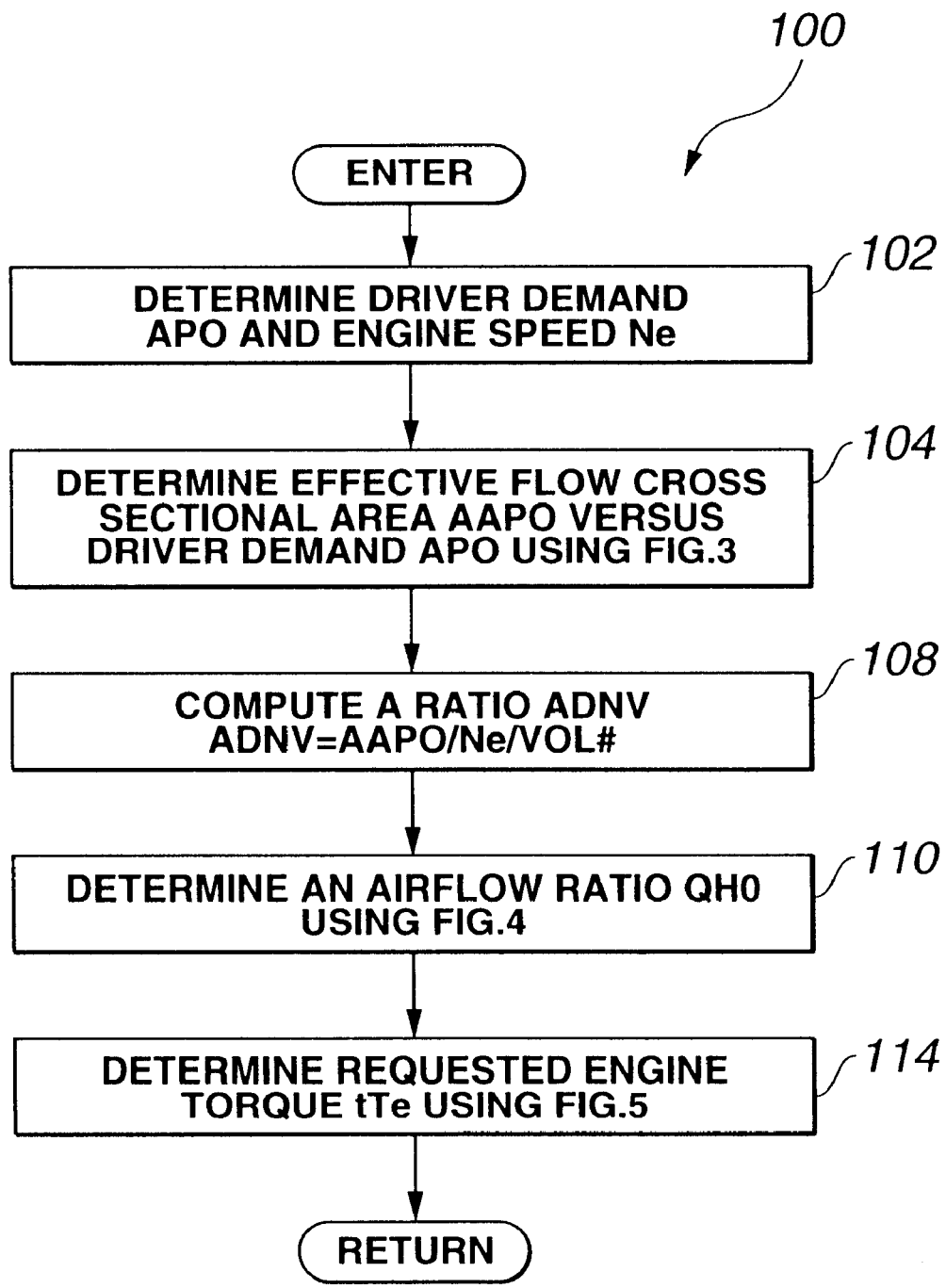
FIG. 2 is a simplified flowchart of a requested engine torque (tTe) determination routine.

Requested engine torque tTe determination routine 100 executed by controller 12 is shown in the flowchart of FIG. 2. Controller 12 executes this routine 100 and each of the following routines at regular intervals of 10 milliseconds.

Figure 3:
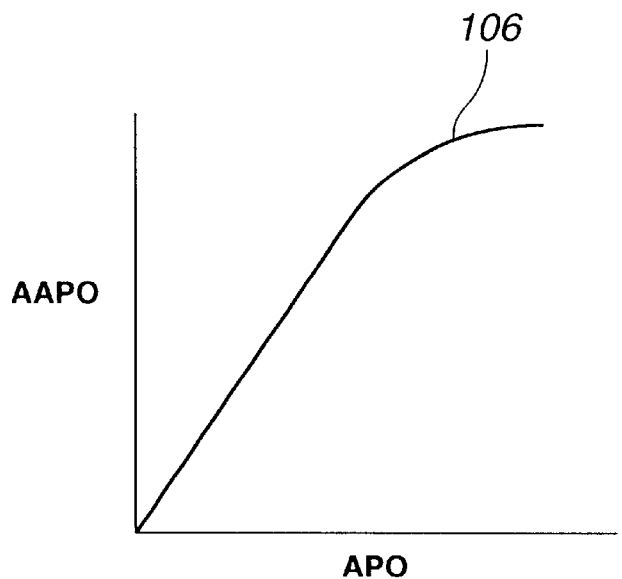
FIG. 3 is a curve illustrating data used to determine flow cross sectional area (AAPO) versus driver demand (APO) in the form of accelerator pedal position.

At step 102, controller 12 reads APP signal 36 to determine a driver demand APO, and reads CID signal 28 to determine an engine speed Ne. At step 104, controller 12 determines an effective cross sectional area AAPO versus driver demand APO using stored data illustrated by a curve 106 in FIG. 3. Curve 106 shows one of various examples of a pattern of variation of effective cross sectional area AAPO against driver demand APO. The pattern of variation may be set accounting for varying of performances with different types of vehicles. According to another example, effective cross sectional area AAPO increases at a gradual rate as driver demand APO increases initially and at an increased rate as driver demand APO increases further. Turning back to FIG. 2, at step 108, controller 12 computes a ratio ADNV, which may be expressed as:

$$ADNV = AAPO/Ne/VOL\# \quad (1)$$

where: VOL# is the displacement of an engine.

Figure 4:
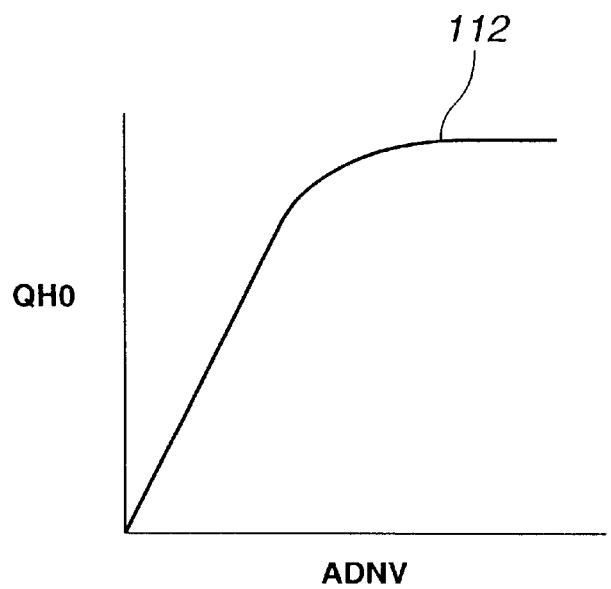
FIG. 4 is a curve illustrating data used to determine airflow ratio (QH0) versus ratio (ADNV) that is a function of flow cross sectional area (AAPO).
Figure 5:
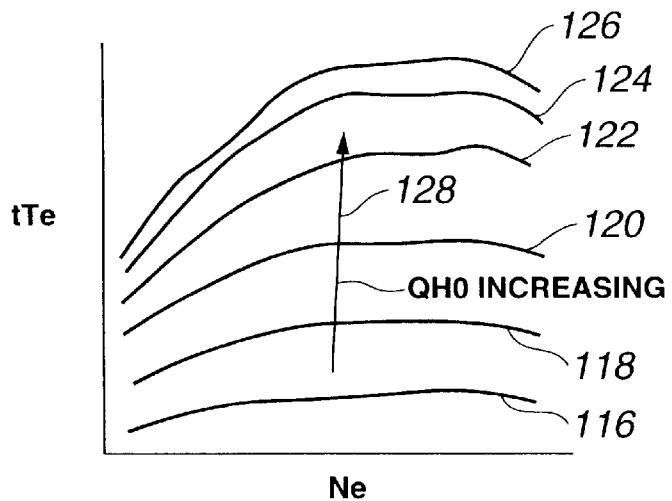
FIG. 5 is a set of curves illustrating data used to determine requested engine torque (tTe) versus engine speed (Ne) and airflow ratio (QH0).

At step 110, controller 12 determines an airflow ratio QH0 versus the ratio ADNV using stored data as illustrated by a curve 112 in FIG. 4. Curve 112 illustrates how much effective cross sectional area AAPO should increase if a need arises to accomplish an increase in in-cylinder air mass from the stoichiometric air/fuel ratio state. In FIG. 2, at step 114, controller 12 determines requested engine torque tTe versus engine speed Ne and airflow ratio QH0 using stored data illustrated by a set of curves 116, 118, 120, 122, 124 and 126 in FIG. 5. Each of these curves represents an equal value of QH0 versus different engine speeds Ne and requested engine torque tTe. The values represented by these curves increase in the direction of an arrow 128.

Figure 6:
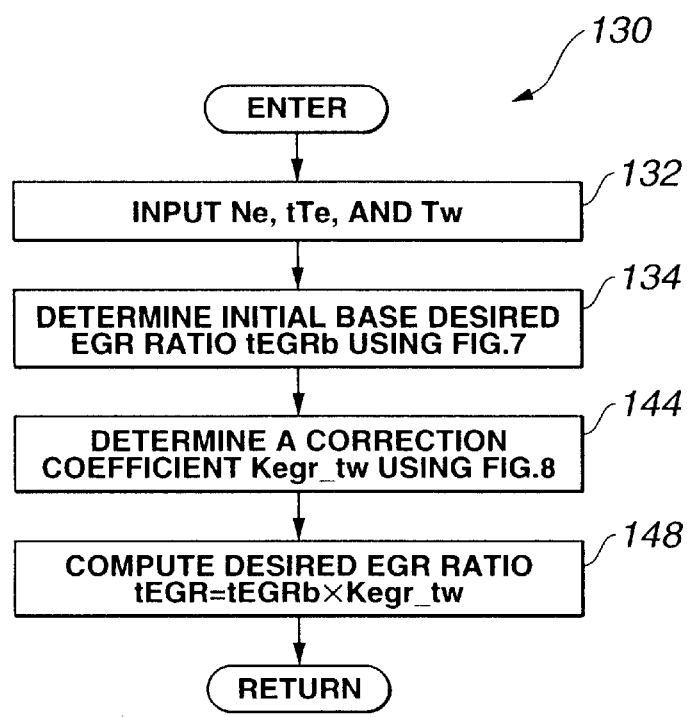
FIG. 6 is a simplified flowchart of a desired exhaust gas recirculation (EGR) rate (tEGR) determination routine.
Figure 7:
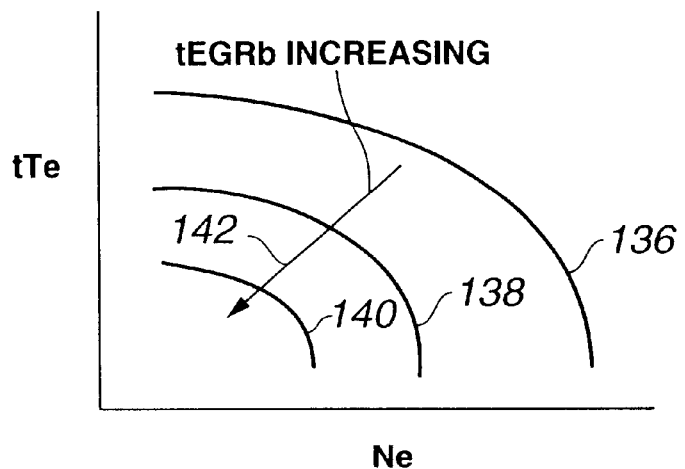
FIG. 7 is a set of curves illustrating data used to determine initial base desired EGR rate (tEGRb) versus engine speed (Ne) and requested engine torque (tTe).
Figure 8:
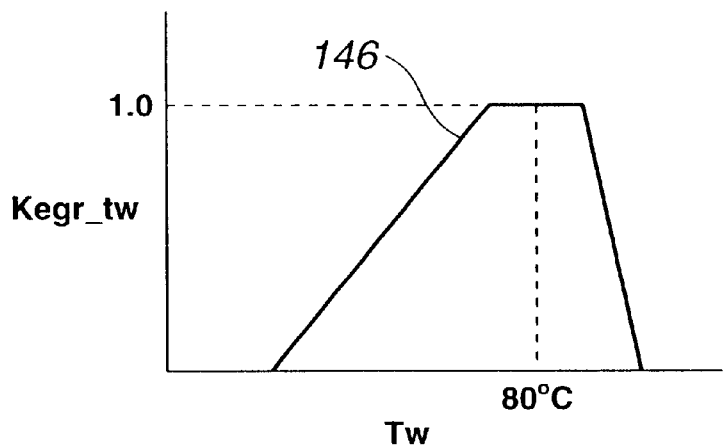
FIG. 8 is a curve illustrating data used to determine correction coefficient (Kegr_tw) versus engine coolant temperature (Tw).

Desired EGR ratio tEGR computation routine 130 executed by controller 12 is shown in the flowchart of FIG. 6. At step 132, controller 12 inputs engine speed Ne and requested engine torque tTe, and reads ECT signal 32 to determine engine temperature Tw. At step 134, controller 12 determines an initial base desired EGR ratio tEGRb using stored data illustrated by a set of curves 136, 138 and 140 in FIG. 7. Each of these curves represents an equal value of tERGb versus different engine speeds Ne and requested engine torque tTe. The values represented by these curves increase in the direction of an arrow 142. In FIG. 6, at step 144, controller 12 determines an engine temperature dependent correction coefficient Kegr_tw using stored data illustrated by a curve 146 in FIG. 8. Curve 146 shows that correction coefficient Kegr_tw stays at 1.0 when engine temperature Tw falls a narrow range extending in the neighborhood of 80° C., but it drops from 1.0 toward zero as engine temperature Tw drops beyond the lower limit of the range or increases beyond the upper limit of the range. In FIG. 6, at step 148, controller 12 computes desired EGR ratio tEGR, which may be expressed as:

$$tEGR = tEGRb \times Kegr\_tw \quad (2)$$

Figure 9:
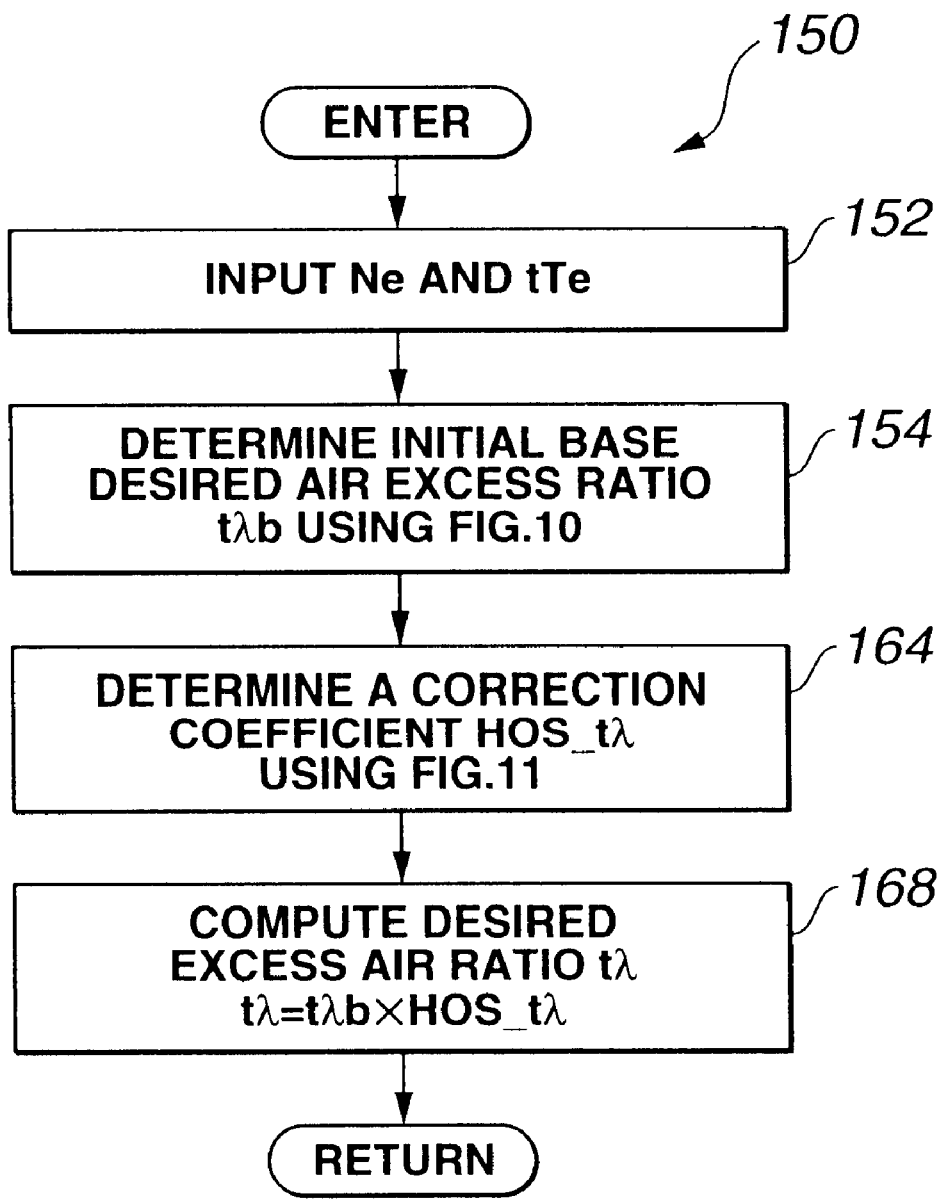
FIG. 9 is a simplified flowchart of a desired excess air ratio (tλ) determination routine.

Desired excess air ratio $t\lambda$ determination routine 150 executed by controller 12 is shown in the flowchart of FIG. 9. At step 152, controller 12 inputs engine speed Ne and requested engine torque tTe. At step 154, controller 12 determines an initial base desired air excess ratio tAb versus engine speed Ne and requested engine torque tTe using stored data illustrated by a set of curves 156, 158 and 160 in FIG. 10. Each of these curves represents an equal value of tAb versus different engine speeds Ne and requested engine torque tTe. The values represented by these curves increase in the direction of an arrow 162. In FIG. 9, at step 164, controller 12 determines an engine temperature dependent correction coefficient HOS_$t\lambda$ versus engine temperature Tw using stored data illustrated by a curve 166 in FIG. 11. Curve 166 shows that correction coefficient HOS_$t\lambda$ stays at 1.0 when engine temperature is not less than 80° C., but it increases from 1.0 as engine temperature Tw drops below 80° C. In FIG. 9, at step 168, controller 12 computes a desired excess air ratio $t\lambda$, which may be expressed as:

$$t\lambda = t\lambda b \times HOS\_t\lambda \quad (3)$$

Figure 10:
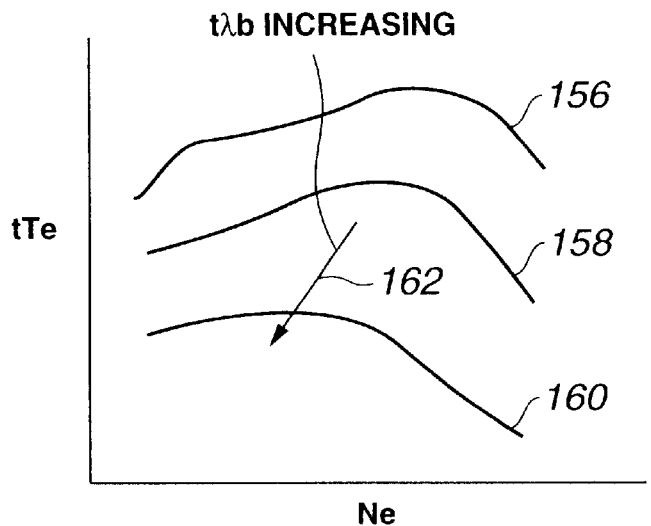
FIG. 10 is a set of curves illustrating data used to determine initial base desired excess air ratio (tλb) versus engine speed (Ne) and requested engine (tTe).
Figure 11:
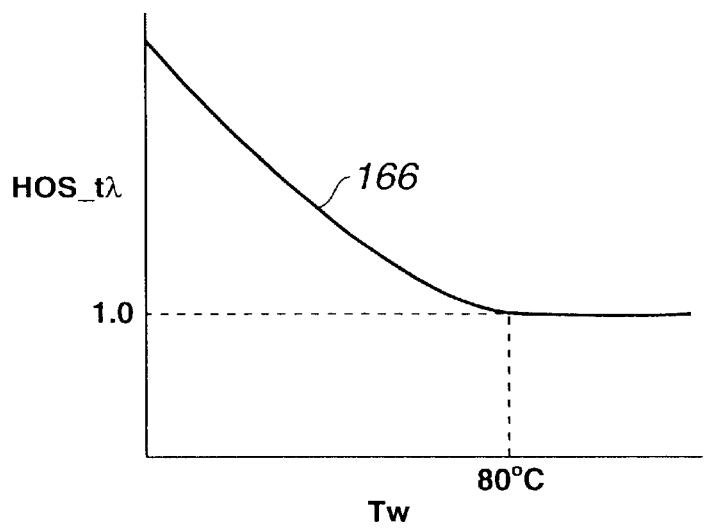
FIG. 11 is a curve illustrating data used to determine correction coefficient (HOS_t λ) versus engine coolant temperature (Tw).

From the above description along with FIGS. 9 to 11, it is appreciated that desired excess air ratio $t\lambda$ is equal to initial base desired excess air ratio $t\lambda b$ when engine temperature is not less than 80° C. although the former deviates from the latter when engine temperature Tw drops below 80° C. As shown in FIG. 10, engine speed Ne and requested engine torque tTe determine initial base desired excess air ratio $t\lambda b$, which, in turn, determines desired excess air ratio $t\lambda$.

The excess air ratio λ may be expressed as:

(Excess Air Ratio)=[(In-cylinder Fresh Air Mass)×{1+(EGR Ratio)×(Rate of Oxygen in EGR Gas)}]/{(Injected Fuel Mass)× (Stoichiometric Air/Fuel Ratio)}     (4).

Figure 12:
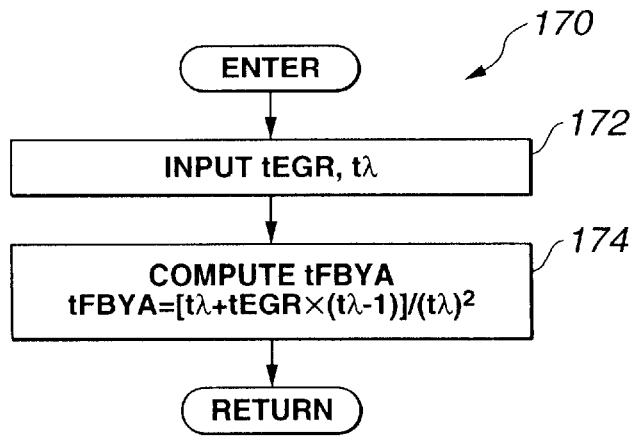
FIG. 12 is a simplified flowchart of a desired equivalence ratio (tFBYA) determination routine.

Desired equivalence ratio tFBYA computation routine 170 executed by controller 12 is shown in the flowchart of FIG. 12. At step 172, controller 12 inputs desired EGR ratio tEGR and desired excess air ratio tλ. At step 174, controller 11 computes desired equivalence ratio tFBYA, which may be expressed as:

$$tFBYA=[t\lambda+tEGR\times(t\lambda-1)]/(t\lambda)^2 \qquad (5).$$

Figure 13:
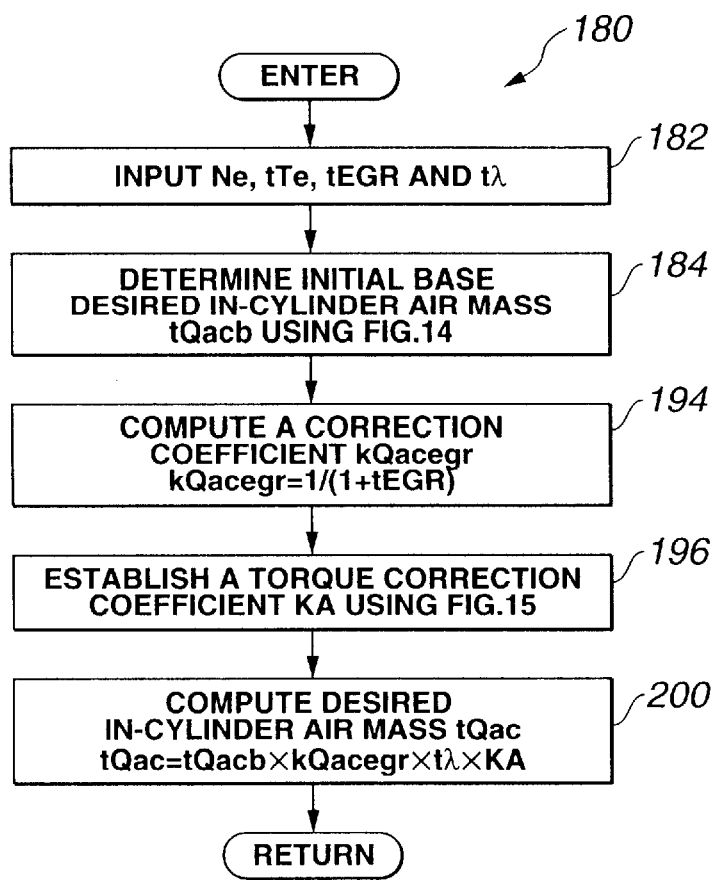
FIG. 13 is a simplified flowchart of a routine including determination of initial base desired in-cylinder air mass (tQacb), establishment of torque correction coefficient (KA), and adjustment of initial base desired in-cylinder air mass (tQacb) to generate desired in-cylinder air mass (tQac).

Desired in-cylinder air mass tQac computation routine 180 executed by controller 12 is shown in the flowchart of FIG. 13. The routine 180 includes determination of an initial base desired in-cylinder air mass tQacb, establishment of a torque correction coefficient KA, and adjustment of the initial base desired in-cylinder air mass tQacb to generate a desired in-cylinder air mass tQac.

Figure 14:
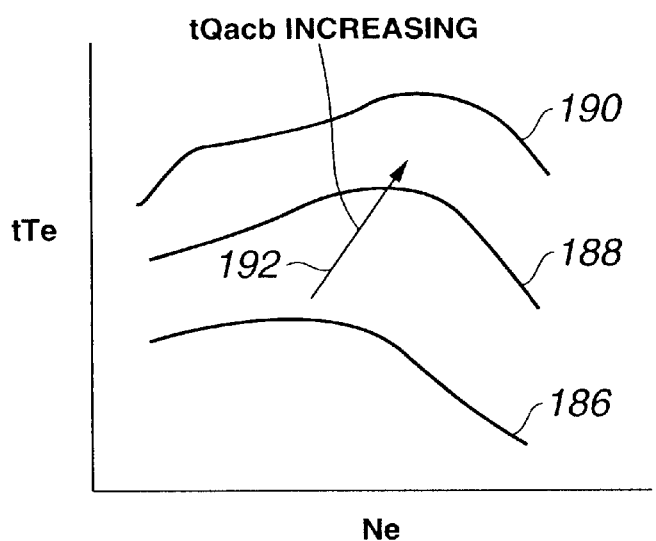
FIG. 14 is a set of curves illustrating data used to determine initial base desired in-cylinder air mass (tQacb) versus engine speed (Ne) and requested engine torque (tTe).

At step 182, controller 12 inputs engine speed Ne, requested engine torque tTe, desired EGR ratio tEGR and desired excess air ratio tλ. At step 184, controller 12 determines initial base desired in-cylinder air mass tQacb versus engine speed Ne and requested engine torque tTe using stored data illustrated by a set of curves 186, 188 and 190 in FIG. 14. Each of these curves represents an equal value of tQacb versus different engine speeds Ne and requested engine torque tTe. The values represented by these curves increase in the direction of an arrow 192. In FIG. 13, at step 194, controller 12 computes a correction coefficient kQacegr, which may be expressed as:

$$kQacegr=1/(1+tEGR) \qquad (6).$$

At step 196, controller 12 establishes a torque correction coefficient KA to compensate for reducing effect of available engine torque in operating range of different excess air ratios λ that are lower than a predetermined value of 1. In one embodiment, controller 12 determines torque correction coefficient KA versus desired excess air ratio tλ using stored data illustrated by a curve 198 in FIG. 15. In this case, controller 12 retrieves curve 198 using desired excess air ratio tλ as excess air ratio λ. In other embodiments, controller 12 determines torque correction coefficient KA versus actual excess air ratio rλ using stored data illustrated by curve 198 in FIG. 15. In such case, controller 12 retrieves curve 198, using actual excess air ratio rλ. As will be later described along with the flowchart of FIG. 27 or 28, controller 12 computes estimated actual excess air ratio rλ for establishing torque correction coefficient KA. Turning back to FIG. 13, at step 200, controller 12 adjusts initial base desired in-cylinder air mass tQacb with at least desired excess air ratio tλ and torque correction coefficient KA to generate a desired in-cylinder air mass tQac. In the embodiment, controller 12 computes desired in-cylinder air mass tQac, which may be expressed as:

$$tQac=tQacb\times kQacegr\times t\lambda\times KA \qquad (7).$$

Figure 15:
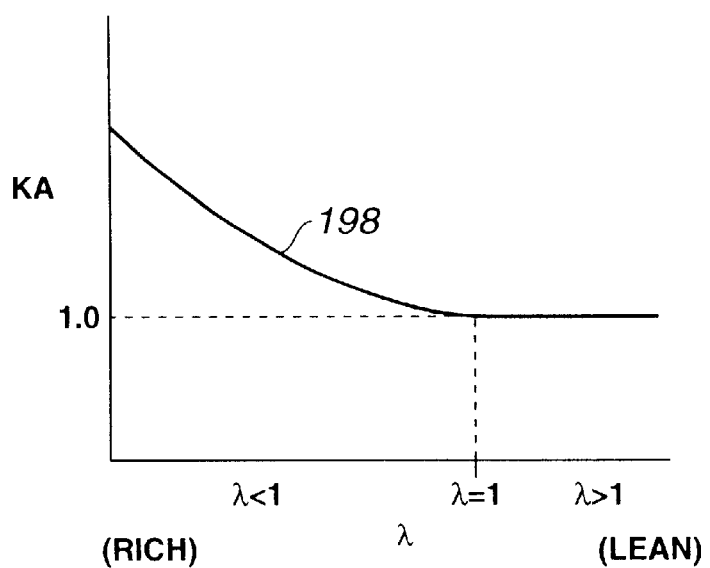
FIG. 15 is a curve illustrating data used to establish torque correction coefficient (KA) versus excess air ratio (λ).

With reference to FIG. 15, curve 198 shows that torque correction coefficient KA is held at 1.0 when excess air ratio λ is equal to 1 or greater than 1. However, when excess air ratio λ is set less than 1 to cause air/fuel mixture to make rich to purge NOx from NOx trap 56, torque correction coefficient KA takes a value greater than 1.

Figure 16:
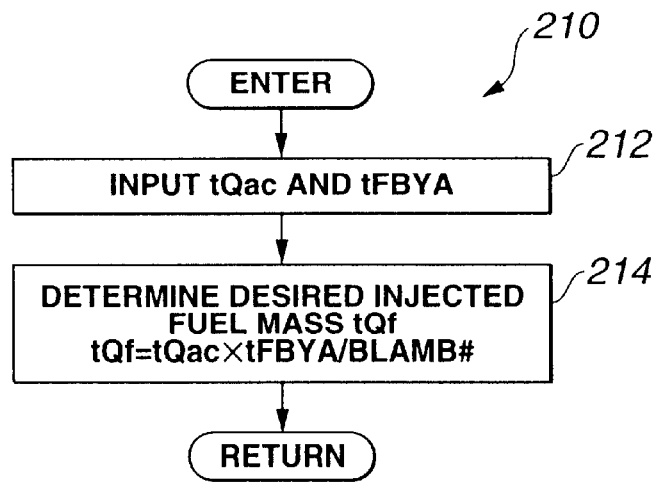
FIG. 16 is a simplified flowchart of a desired injected fuel mass (tQf).

Desired injected fuel mass tQf determination routine 210 executed by controller 12 is shown in the flowchart of FIG. 16. At step 212, controller 12 inputs desired in-cylinder air mass tQac and desired equivalence ratio tFBYA. At step 214, controller 12 determines a desired injected fuel mass tQf, which may be expressed as:

$$tQf=tQac\times tFBYA/BLAMB\# \qquad (8)$$

where: BLAMB# is the stoichiometric air/fuel ratio.

Controller 12 generates fuel injector signal based on desired injected fuel mass tQf so that fuel injectors 48 inject fuel to achieve the desired injected fuel mass tQf in the associated cylinders.

From the preceding description, it is now understood from equation (5) that desired equivalence ratio tFBYA accounts for both the rate of oxygen of desired EGR ratio tEGR and desired excess air ratio tλ. In the embodiment, as is clear from equation (8), this desired equivalence ratio tFBYA is multiplied with desired in-cylinder air mass tQac to determine desired injected fuel mass tQf, making it possible to achieve desired EGR ratio tEGR and desired excess air ratio tλ even if they are subject to great changes, respectively.

From the preceding description along the flowchart of FIG. 13, it is now understood that desired in-cylinder air mass tQac results from adjustment of initial desired in-cylinder air mass tQacb with at least desired excess air ratio tλ and torque correction coefficient KA. In the embodiment, desired in-cylinder air mass tQac also accounts for desired EGR ratio tEGR by using correction coefficient kQacegr in adjusting initial base desired in-cylinder air mass tQacb in determining desired in-cylinder air mass tQac. In one embodiment, to achieve this desired in-cylinder air mass tQac, controller 12 generates throttle command signal 86 to control throttle 84. In another embodiment, to achieve desired in-cylinder air mass tQac, controller 12 generates EGR command signal 98 to control EGR control valve 96.

Figure 17:
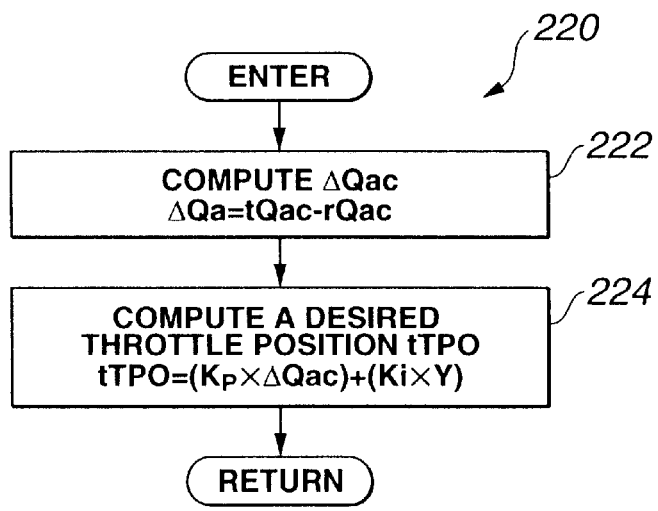
FIG. 17 is a simplified flowchart of a desired throttle position (tTPO) computation routine.

Desired throttle position tTPO computation routine 220 executed by controller 12 is shown in the flowchart of FIG. 17. At step 222, controller 12 computes an air mass error ΔQac, which may be expressed as:

$$\Delta Qac=tQac-rQac \qquad (9)$$

where: rQac is the actual in-cylinder air mass that may be estimated by executing actual in-cylinder air mass computation routine 260 shown in the flowchart of FIG. 22.

At step 224, controller 12 computes a desired throttle position throttle tTPO, which may be expressed as:

$$tTPO=(Kp\times\Delta Qac)+(Ki\times Y) \qquad (10)$$

where: Kp is the proportional gain;
Ki is the integral gain; and
Y is the value computed by the following equation.

$$Y=Y(-1)+\Delta Qac\times\Delta t \qquad (11)$$

where: Y(−1) is the previous value of Y which was obtained in the last execution of the routine 220, the initial value Y(0) being zero, Y(0)=0.

The computation to give desired throttle position tTPO represents the so-called proportional integral control (PI control). The gains Kp and Ki may be fixed values, respectively, or may be altered accounting for different operating conditions. In the embodiment, the PI control has been employed. But, such PI control may combine with the feedforward control.

Figure 18:
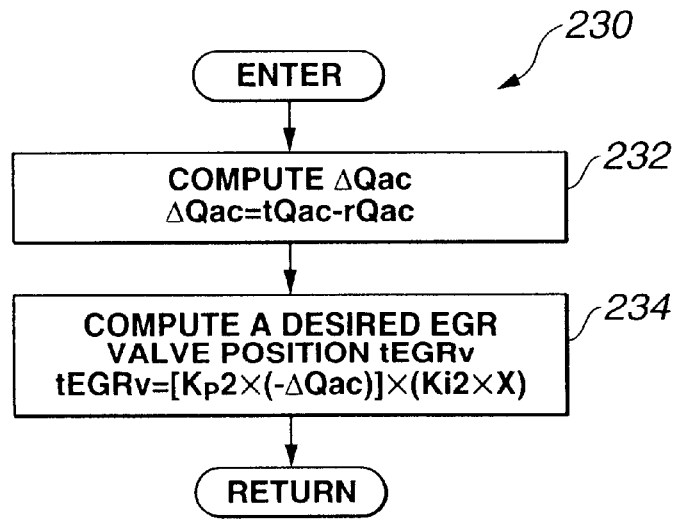
FIG. 18 is a simplified flowchart of a desired EGR valve position (tEGR) computation routine.

Desired EGR valve position tEGRv computation routine 230 executed by controller 12 is shown in the flowchart of FIG. 18. At step 232, controller 12 computes an air mass error ΔQac, which may be expressed by equation (9). At step 234, controller 12 computes a desired EGR valve position tEGRv, which may be expressed as:

$$tEGRv=[Kp2\times(-\Delta Qac)]+(Ki2\times X) \quad (12)$$

where: Kp2 is the proportional gain;
Ki2 is the integral gain; and
X is the value computed by the following equation.

$$X=X(-1)+(-\Delta Qac)\times \Delta t \quad (13)$$

where: X(−1) is the previous value of X which was obtained in the last execution of the routine 230, the initial value X(0) being zero, X(0)=0.

The computation to give desired EGR valve position tEGRv represents the so-called proportional integral control (PI control). The gains Kp2 and Ki2 may be fixed values, respectively, or may be altered accounting for different operating conditions. In the embodiment, the PI control has been employed. But, such PI control may combine with the feedforward control.

Controller 12 executes desired EGR valve position tEGRv computation routine 230 to alter actual in-cylinder air mass rQac. If it is desired to cause an increase in actual in-cylinder air mass rQac, controller 12 moves EGR control valve 96 in a closing direction to decrease EGR gas portion of the cylinder charge. If it is desired to cause a reduction in actual in-cylinder air mass rQac, controller moves EGR control valve 96 in an opening direction to increase EGR gas portion of the cylinder charge.

The PI gains, which include Kp, Ki, Kp2 and Ki2, are greater than 0 (zero).

Figure 19:
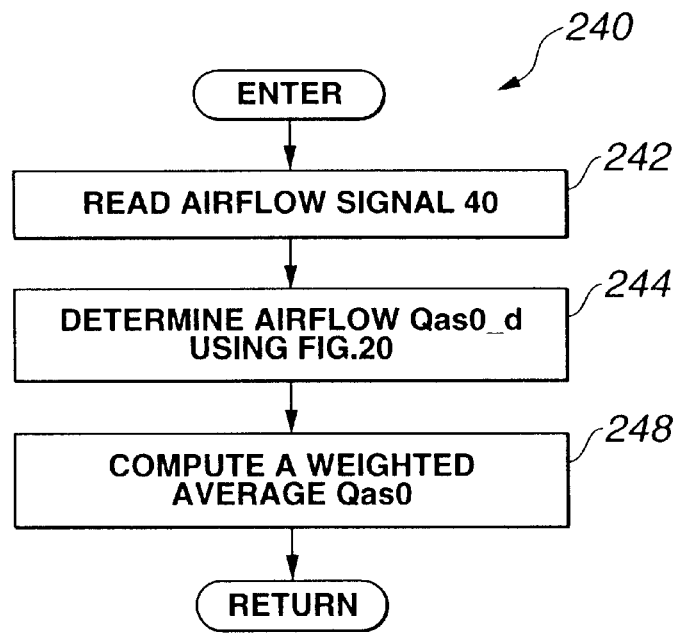
FIG. 19 is a simplified flowchart of an actual airflow (Qas0) computation routine.
Figure 21:
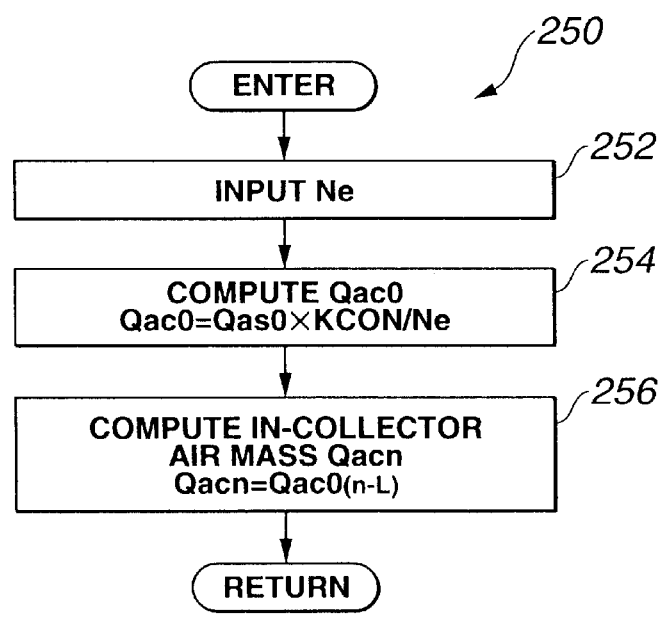
FIG. 21 is a simplified flowchart of an in-collector air mass (Qacn) computation routine.

To estimate actual in-cylinder air mass rQac, controller 12 executes routines shown in the flowcharts of FIGS. 19, 21 and 22.

Figure 20:
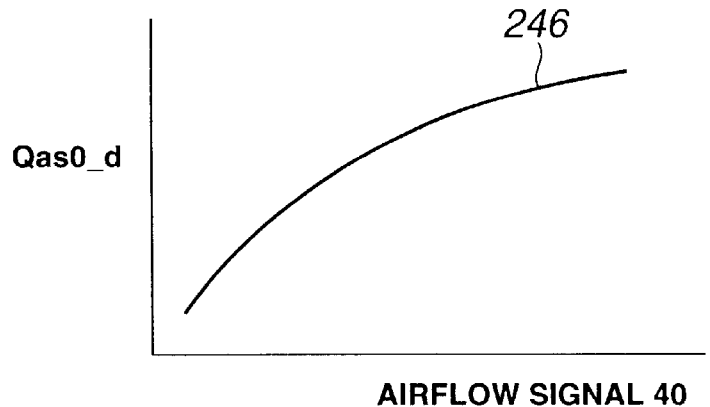
FIG. 20 is a curve used to determine airflow (Qas0_d) versus airflow signal.

Actual airflow Qas0 computation routine 240 executed by controller 12 is shown in the flowchart of FIG. 19. At step 242, controller 12 reads airflow signal 40. At step 244, controller 12 determines detected airflow Qas0_d versus airflow signal 40 using stored data illustrated by a curve 246 in FIG. 20. Curve 236 shows the relationship between detected airflow Qas0_d and airflow signal 40 from airflow sensor 42. At step 248, controller 12 computes the weighted average Qas0 of detected airflow Qas0_d.

In-collector air mass Qacn computation routine 250 executed by controller 12 is shown in the flowchart of FIG. 21. At step 252, controller 12 inputs engine speed Ne. At step 254, controller 12 computes air mass per one cylinder Qac0, which may be expressed as:

$$Qac0=Qas0\times Kcon/Ne \quad (14)$$

where: Kcon is the constant, which takes the value of 30 in the case of a four-cylinder engine, or the value of 20 in the case of a six-cylinder engine.

At step 256, controller 12 processes Qac0 accounting for transportation delay from airflow sensor 42 to collector 82 to compute in-collector air mass Qacn, which may be expressed as:

$$Qacn=Qac0(n-L) \quad (15)$$

where: L is the number of routine execution cycles to be preceded accounting for the transportation delay.

Actual in-cylinder air mass rQac computation routine 260 executed by controller 12 is shown in the flowchart of FIG. 22. At step 262, controller 12 inputs in-collector air mass Qacn and an accumulation coefficient Kkin, which is updated by execution of routine shown in the flowchart of FIG. 25. At step 264, controller 12 processes Qacn using Kkin to compute actual in-cylinder air mass rQac, which may be expressed as:

$$rQac=Qacn\times Kkin+Qac(n-1)\times(1-Kkin) \quad (16).$$

To estimate actual in-cylinder EGR mass rQec, controller 12 executes routine shown in the flowchart of FIG. 23.

Actual in-cylinder EGR mass rQec computation routine 270 executed by controller 12 is shown in FIG. 23. At step 272, controller 12 inputs actual in-cylinder air mass rQac, desired EGR ratio tEGR and accumulation coefficient Kkin. At step 274, controller 12 computes in-collector EGR mass Qec0, which may be expressed as:

$$Qec0=Qacn\times tEGR \quad (17).$$

At step 276, controller 2 computes actual in-cylinder EGR mass rQec, which may be expressed as:

$$rQec=Qec0\times Kkin\times KE\#+Qec0(n-1)\times(1-Kkin\times KE\#) \quad (18)$$

where: the term Kkin×KE# is the time constant of a delay due to the collector volume, and KE# is the coefficient.

Figure 24:
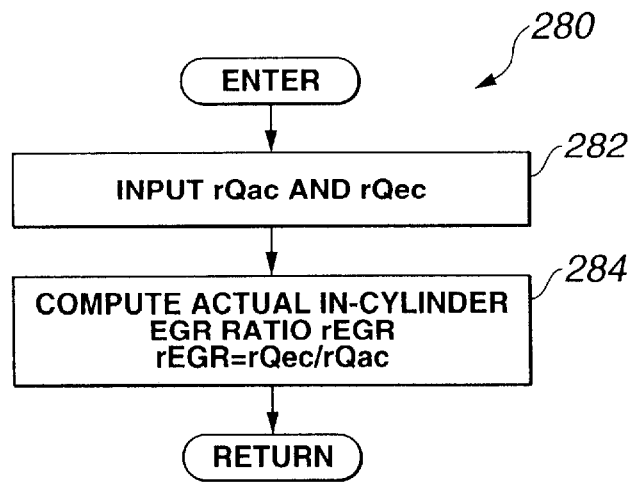
FIG. 24 is a simplified routine of an actual in-cylinder EGR ratio (rEGR) computation routine.

To estimate actual in-cylinder EGR ratio rEGR, controller 12 executes routine shown in the flowchart of FIG. 24.

Actual in-cylinder EGR ratio rEGR computation routine 280 executed by controller 12 is shown in the flowchart of FIG. 24. At step 282, controller 12 inputs actual in-cylinder air mass rQac and actual in-cylinder EGR mass rQec. At step 284, controller 12 computes actual in-cylinder EGR ratio rEGR, which may be expressed as:

$$rEGR=rQec/rQac \quad (19).$$

Figure 25:
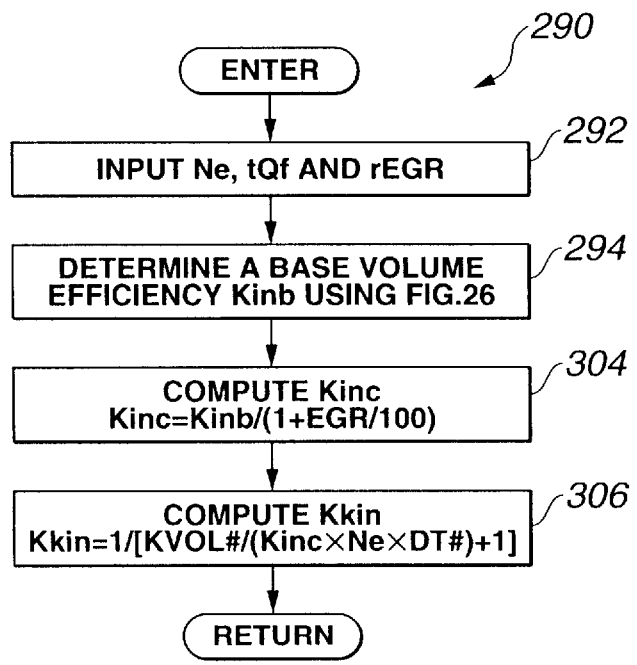
FIG. 25 is a simplified routine of a collector volume delay (CVD) time constant (Kkin) computation routine.

The before-mentioned accumulation coefficient Kkin is updated by execution of routine shown in the flowchart of FIG. 25.

Figure 26:
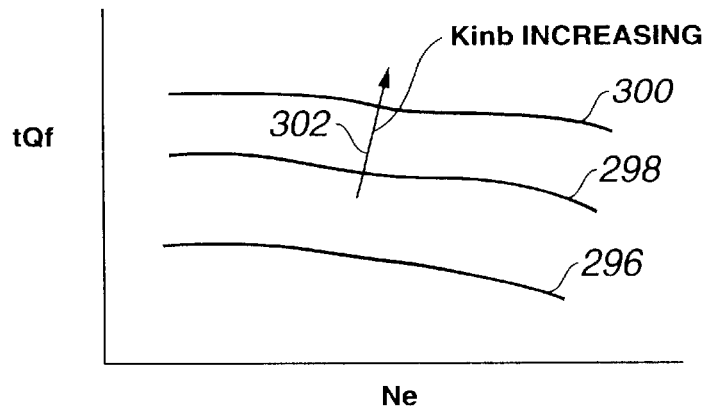
FIG. 26 is a set of curves illustrating data used to determine a base volume efficiency (Kinb) versus engine speed (Ne) and desired injected fuel mass (tQf).

Accumulation coefficient Kkin computation routine 290 executed by controller 12 is shown in the flowchart of FIG. 25. At step 292, controller 12 inputs engine speed Ne, desired injected fuel mass tQf and actual EGR ratio rEGR. At step 294, controller 12 determines a base volume efficiency Kinb versus engine speed Ne and desired injected fuel mass tQf using stored data illustrated by a set of curves 296, 298 and 300 in FIG. 26. Each of these curves represents an equal value of Kinb versus different engine speeds Ne and desired injected fuel mass tTe. The values represented by these curves increase in the direction of an arrow 302.

In FIG. 25, at step 304, controller 12 computes calibrated value Kinc of base volume efficiency Kinb. Calibrated value Kinc may be expressed as:

$$Kinc=Kinb/(1+rEGR/100) \quad (20).$$

At step 306, controller 12 computes accumulation coefficient Kkin, which may be expressed as:

$$Kkin=1/[KVOL\#/(Kinc\times Ne\times DT\#)+1] \quad (21)$$

where: KVOL#=120×VC/VE,
VC is the collector volume,
VE is the displacement of an engine, and
DT# is the sampling time.

With reference again to FIG. 15, torque correction coefficient KA is given by retrieving curve 198 using desired excess air ratio tλ in the exemplary embodiment. In this case, a shift in desired excess air ratio tλ to a value less than 1 to purge NOx from NOx trap 56 causes a step-like increase in actual injected fuel mass rQf followed by a gradual increase in actual in-cylinder air mass rQac. There occurs over enriched state until the desired excess air ratio is achieved. If it is desired to trim unnecessary consumption of fuel until desired excess air ratio tλ is achieved, actual excess air ratio rλ is used instead of desired excess air ratio tλ in retrieving curve 198 in FIG. 15 to determine torque correction coefficient KA.

With reference to FIGS. 27–30, in the following description, two examples of estimating actual excess air ratio rλ will be described.

Figure 27:
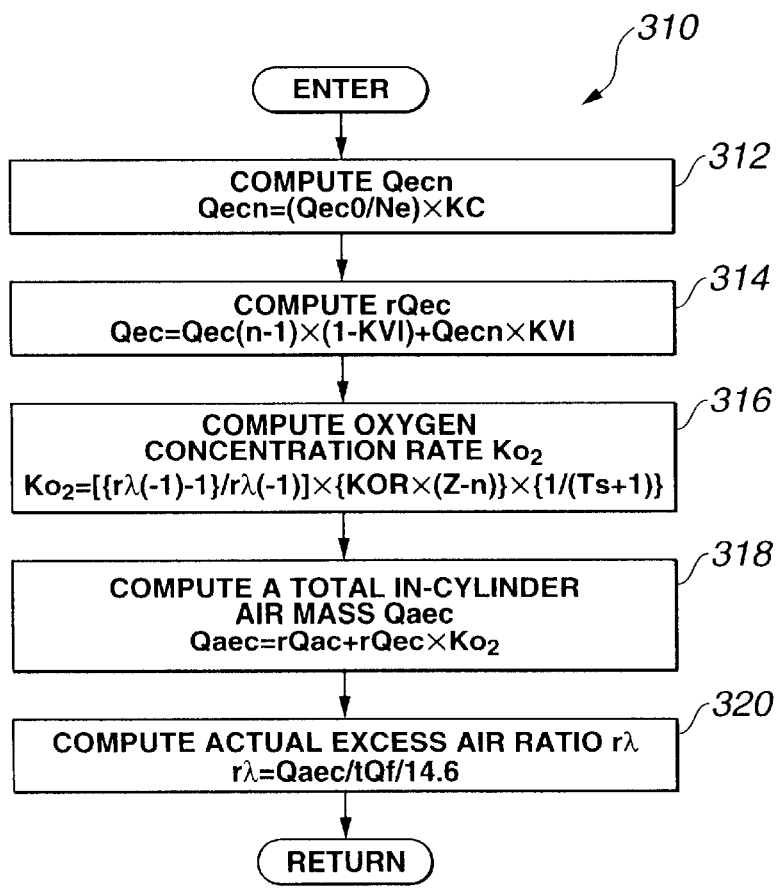
FIG. 27 is a simplified flowchart of an estimated actual excess air ratio (rλ) computation routine.

In one exemplary embodiment, controller 12 estimates actual excess air ratio rλ by execution of estimated actual excess air ratio rλ routine 310 shown in the flow chart of FIG. 27.

In FIG. 27, at step 312, controller 12 computes EGR mass per one cylinder Qecn, which may be expressed as:

$$Qecn = (Qec0/Ne) \times KC \tag{22}$$

where: Qec0 is the in-collector EGR mass that is given by equation (17);
KC is the fixed gain.

At step 314, controller 12 computes actual in-cylinder EGR mass rQec, which may be expressed as:

$$rQec = Qec(n-1) \times (1-KV1) + Qecn \times KV1 \tag{23}$$

where: KV1 is the delay time constant.

At step 316, controller 12 computes the rate of oxygen $Ko_2$ remaining in EGR gas. Which may be expressed as:

$$Ko_2 = [\{r\lambda(-1)-1\}/r\lambda(-1)] \times \{KOR \times (Z-n)\} \times \{1/(Ts+1)\} \tag{24}$$

where: the term $\{r\lambda(-1)-1\}/r\lambda(-1)$ indicates the rate of fresh air remaining in EGR gas;
the term $\{KOR \times (Z-n)\}$ indicates the dead time over n number of routine execution cycles; and
the term $\{1/(Ts+1)\}$ indicates the first delay processing.

At step 318, controller 12 computes a total in-cylinder air mass Qaec, which may be expressed as:

$$Qaec = rQac + rQec \times Ko_2 \tag{25}$$

At step 320, controller 12 computes estimated actual excess air ratio rλ, which may be expressed as:

$$r\lambda = Qaec/tQf/14.6 \tag{26}$$

The estimated actual excess air ratio rλ closely approximates the actual variation of cylinder charge because it accounts for oxygen content of new charge, oxygen content remaining in EGR gas as well as delay and diffusion of EGR gas within intake manifold. According to this exemplary embodiment, estimated actual excess air ratio rλ is used in step 196 of routine 180 shown in the flowchart of FIG. 13.

Figure 28:
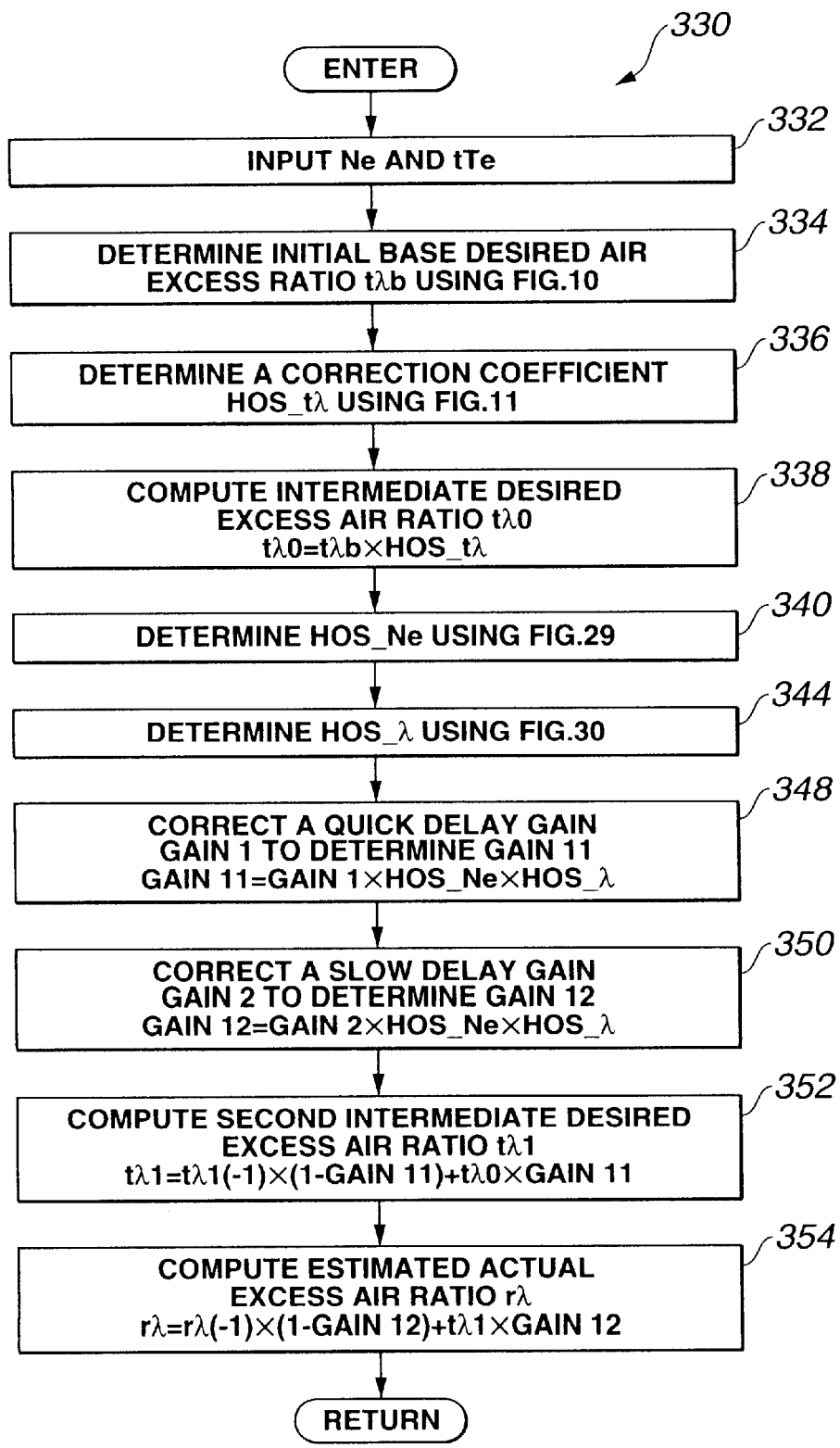
FIG. 28 is a simplified flow chart of an estimated actual excess air ratio (rλ) computation routine.

In another exemplary embodiment, controller 12 estimates actual excess air ratio rλ by execution of estimated actual excess air ratio rλ computation routine 330 shown in the flowchart of FIG. 28. At step 332, controller 12 inputs engine speed Ne and requested engine torque tTe. At step 334, controller 12 determines an initial base desired air excess ratio tλb versus engine speed Ne and requested engine torque tTe using stored data illustrated by a set of curves 156, 158 and 160 in FIG. 10. At step 336, controller 12 determines an engine temperature dependent correction coefficient HOS_tλ versus engine temperature Tw using stored data illustrated by a curve 166 in FIG. 11. At step 338, controller 12 computes an intermediate desired excess air ratio tλ0, which may be expressed as:

$$t\lambda 0 = t\lambda b \times HOS\_t\lambda \tag{27}$$

Figure 29:
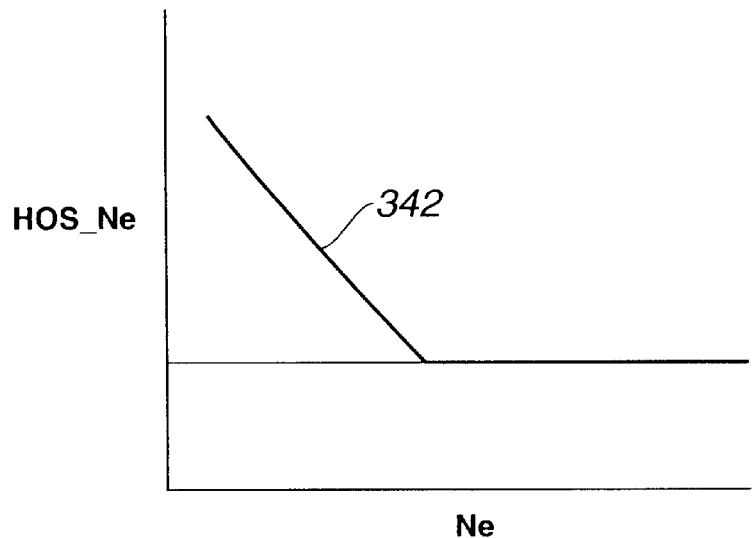
FIG. 29 is a curve illustrating data used to determine an engine speed dependent correction coefficient (HOS_Ne) versus engine speed (Ne).
Figure 30:
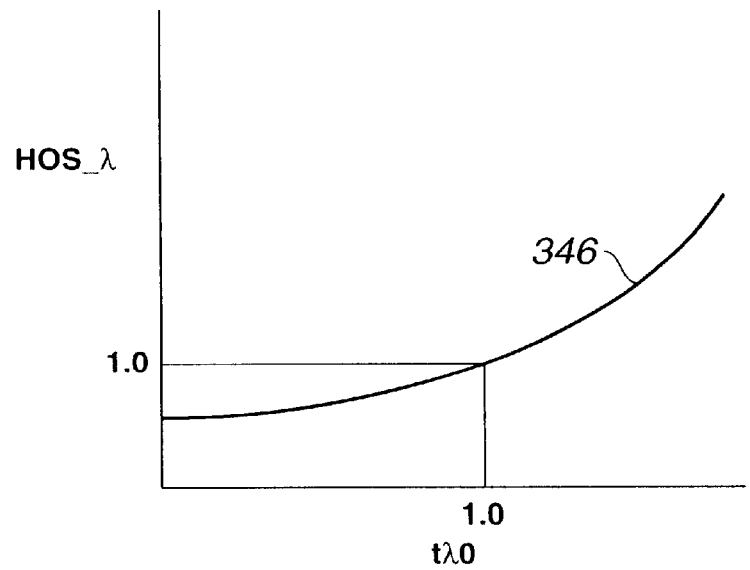
FIG. 30 is a curve illustrating data used to determined an excess air ratio dependent correction coefficient (HOS_A) versus intermediate desired excess air ratio (tλ0).

At step 340, controller 12 determines an engine speed dependent correction coefficient HOS_Ne versus engine speed Ne using stored data illustrated by a curve 342 in FIG. 29. At step 344, controller 12 determines an excess air ratio dependent correction coefficient HOS_λ versus intermediate desired excess air ratio tλ0 using stored data illustrated by a curve 346 in FIG. 30.

At step 348, controller 12 corrects a quick delay gain GAIN 1 with correction coefficients HOS_Ne and HOS_λ. The manner of such correction may be expressed as:

$$GAIN\ 11 = GAIN\ 1 \times HOS\_Ne \times HOS\_\lambda \tag{28}$$

where: GAIN 11 is the final quick gain that is the GAIN 1 as corrected.

It is to be noted that the quick delay gain GAIN 1 is a relatively quick component of a delay, which has been determined accounting for quick varying of fresh charge due to consumption of air by the engine immediately after engine throttle 84 has been closed.

At step 350, controller 12 corrects a slow delay gain GAIN 2 with correction coefficients HOS_Ne and HOS_λ. The manner of such correction may be expressed as:

$$GAIN\ 12 = GAIN\ 2 \times HOS\_Ne \times HOS\_\lambda \tag{29}$$

where: GAIN 12 is the final slow gain that is the GAIN 2 as corrected.

It is to be noted that the slow delay gain GAIN 2 is a relatively slow component of a delay, which has been determined accounting for slow varying of residual oxygen within EGR gas.

At step 352, controller 12 computes a second intermediate desired excess air ratio tλ1, which may be expressed as:

$$t\lambda 1 = t\lambda 1(-1) \times (1-GAIN\ 11) + t\lambda 0 \times GAIN\ 11 \tag{30}$$

At step 354, controller 12 computes an estimated actual excess air ratio rλ, which may be expressed as:

$$r\lambda = r\lambda(-1) \times (1-GAIN\ 12) + t\lambda 1 \times GAIN\ 12 \tag{31}$$

According to this exemplary embodiment, estimated actual excess air ratio rλ is used in step 196 of routine 180 shown in the flowchart of FIG. 13.

In other exemplary embodiment, controller 12 determines actual excess air ratio rλ by reading oxygen signal 64 from an EGR sensor 62 (see FIG. 1). In this case, controller 12 utilizes this detected actual excess air ratio rλ is used to retrieve curve 198 in FIG. 15.

Figure 31:
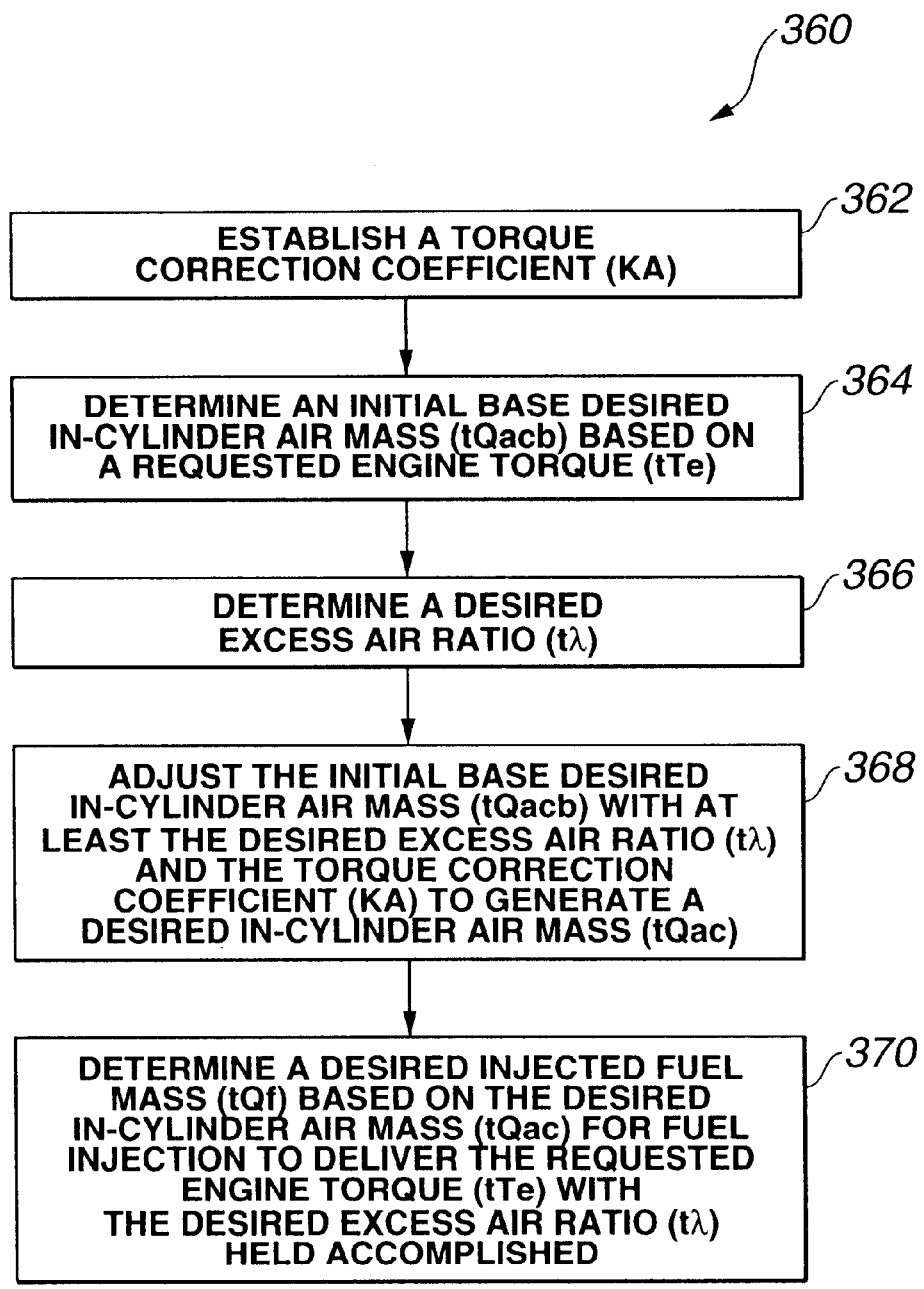
FIG. 31 is a block diagram illustrating a method of the present invention for controlling an engine.

With reference to FIG. 31, a method of the present invention for controlling an engine is generally indicated at 360. At block 362, a torque correction coefficient KA is established to compensate for reducing effect of available engine torque in operating range of different excess air ratios λ that are lower than a predetermined value (see FIG. 15). At block 364, an initial base desired in-cylinder air mass tQacb is determined based on a requested engine torque tTe. At block 366, a desired excess air ratio tλ is determined. At block 368, an initial base desired in-cylinder air mass tQacb is adjusted with at least the desired excess air ratio tλ and the torque correction coefficient KA to generate a desired in-cylinder air mass tQac. At block 370, a desired injected fuel mass tQf is determined based on the desired in-cylinder air mass tQac for fuel injection to deliver the requested engine torque tTe with the desired excess air ratio t$\lambda$ held accomplished.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-101696, filed Mar. 30, 2001, and No. P2001-362935, filed Nov. 28, 2001, the disclosure of each of which is hereby incorporated by reference in its entirety.

What is claimed is:

1. A method for controlling an engine, the method comprising:
    establishing a torque correction coefficient to compensate for reducing effect of available engine torque in operating range of different excess air ratios that are lower than a predetermined value;
    determining an initial base desired in-cylinder air mass based on a requested engine torque;
    determining a desired excess air ratio;
    adjusting said initial base desired in-cylinder air mass with at least said desired excess air ratio and said torque correction coefficient to generate a desired in-cylinder air mass; and
    determining a desired injected fuel mass based on said desired in-cylinder air mass for fuel injection to deliver said requested engine torque with said desired excess air ratio held accomplished.

2. The method as claimed in claim 1, wherein said determining an initial base desired in-cylinder air mass comprises determining said requested engine torque based on a driver demand and an engine speed.

3. The method as claimed in claim 2,
    wherein said determining an initial base desired in-cylinder air mass comprises determining an initial base desired in-cylinder air mass based on said requested engine torque and the engine speed; and
    wherein said determining a desired excess air ratio comprises determining a desired excess air ratio based on said requested engine torque and the engine speed.

4. The method as claimed in claim 1,
    further comprising determining a desired EGR ratio; and
    wherein said adjusting said initial base desired in-cylinder air mass with at least said torque correction coefficient to generate a desired in-cylinder air mass comprises adjusting said initial base desired in-cylinder air mass with said torque correction coefficient and said desired EGR to generate said desired in-cylinder air mass.

5. The method as claimed in claim 4, wherein said establishing a torque correction coefficient comprises determining said torque correction coefficient based on said desired excess air ratio.

6. The method as claimed in claim 4, wherein said establishing a torque correction coefficient comprises determining said torque correction coefficient based on an actual excess air ratio.

7. The method as claimed in claim 4, wherein said establishing a torque correction coefficient comprises estimating an actual excess air ratio based on an actual oxygen mass of EGR gas and an actual airflow mass, and determining a torque correction coefficient based on said estimated actual excess air ratio.

8. The method as claimed in claim 4, wherein said establishing a torque correction coefficient comprises estimating an actual excess air ratio based on a first delay gain that has been set accounting for changes in said desired excess air ratio due to varying of oxygen content of said airflow mass and a second delay gain that has been set accounting for changes in said desired excess air ratio due to varying of actual oxygen content of EGR gas, and determining said torque correction coefficient based on said estimated actual excess air ratio.

9. A computer readable storage media having stored data representing instructions to control an engine, the computer readable storage media comprising:
    instructions for establishing a torque correction coefficient to compensate for reducing effect of available engine torque in operating range of different excess air ratios lower than a predetermined value;
    instructions for determining an initial base desired in-cylinder air mass based on a requested engine torque;
    instructions for determining a desired excess air ratio;
    instructions for adjusting said initial base desired in-cylinder air mass with at least said desired excess air ratio and said torque correction coefficient to generate a desired in-cylinder air mass; and
    instructions for determining a desired injected fuel mass based on said desired in-cylinder air mass for fuel injection to deliver said requested engine torque with said desired excess air ratio held accomplished.

10. The computer readable storage media as claimed in claim 9, wherein the instructions for determining an initial base desired in-cylinder air mass based on a requested engine torque comprises:
    instructions for determining said requested engine torque based on an accelerator position and an engine speed.

11. The computer readable storage media as claimed in claim 10, wherein the instructions for adjusting said initial base desired in-cylinder air mass with at least said desired excess air ratio and said torque correction coefficient comprises:
    instructions for determining a EGR correction coefficient; and
    instructions for adjusting said initial base desired in-cylinder air mass with said EGR correction coefficient.

12. The computer readable storage media as claimed in claim 11, wherein the instructions for determining a desired injected fuel mass based on said desired in-cylinder air mass comprises:
    instructions for determining said desired injected fuel mass based on said desired in-cylinder air mass; and
    instructions for delivering said desired injected fuel mass.

13. The computer readable storage media as claimed in claim 12, wherein the instructions for establishing a torque correction coefficient comprises:
    instructions for determining said torque correction coefficient based on said desired excess air ratio.

14. The computer readable storage media as claimed in claim 12, wherein the instructions for establishing a torque correction coefficient comprises:
    instructions for detecting an actual excess ratio; and instructions for determining said torque correction coefficient based on said detected actual excess ratio.

15. The computer readable storage media as claimed in claim 12, wherein the instructions for establishing a torque correction coefficient comprises:

instructions for estimating an actual excess air ratio; and instructions for determining said torque correction coefficient based on said estimated actual excess air ratio.

16. The computer readable storage media as claimed in claim 15, wherein the instructions for estimating an actual excess air ratio comprises:

instructions for determining an intermediate desired excess air ratio based on said requested engine torque and the engine speed;

instructions for establishing a quick delay gain accounting for varying of fresh charge due to consumption of air by the engine immediately after an engine throttle has been closed;

instructions for establishing a slow delay gain accounting for varying of residual oxygen within EGR gas;

instructions for establishing an engine speed dependent correction coefficient based on the engine speed;

instructions for establishing an excess air ratio dependent correction coefficient based on said intermediate desired excess air ratio;

instructions for correcting said quick delay gain with said engine speed dependent correction coefficient and said excess air ratio dependent correction coefficient to generate a final quick delay gain;

instructions for correcting said slow delay gain with said engine speed dependent correction coefficient and said excess air ratio dependent correction coefficient to generate a final slow delay gain;

instructions for updating said intermediate desired excess air ratio using said final quick delay gain to generate an intermediate desired excess air ratio; and instructions for updating said intermediate desired excess air ratio using said final slow delay gain to generate said actual excess air ratio.

17. A system for controlling an engine, comprising:

a plurality of sensors for sensing a plurality of operating parameters of the engine; and an ECU having control logic operative to establish a torque correction coefficient to compensate for reducing effect of available engine torque in operating range of different excess air ratios that are lower than a predetermined value;

to determine an initial base desired in-cylinder air mass based on a requested engine torque;

to determine a desired excess air ratio;

to adjust said initial base desired in-cylinder air mass with at least said desired excess air ratio and said torque correction coefficient to generate a desired in-cylinder air mass; and to determine a desired injected fuel mass based on said desired in-cylinder air mass for fuel injection to deliver said requested engine torque with said desired excess air ratio held accomplished.

18. A system for controlling an engine, comprising:

means for establishing a torque correction coefficient to compensate for reducing effect of available engine torque in operating range of different excess air ratios that are lower than a predetermined value;

means for determining an initial base desired in-cylinder air mass based on a requested engine torque;

means for determining a desired excess air ratio;

means for adjusting said initial base desired in-cylinder air mass with at least said desired excess air ratio and said torque correction coefficient to generate a desired in-cylinder air mass; and means for determining a desired injected fuel mass based on said desired in-cylinder air mass for fuel injection to deliver said requested engine torque with said desired excess air ratio held accomplished.

* * * * *